United States Patent
Arians et al.

(10) Patent No.: US 10,157,068 B2
(45) Date of Patent: Dec. 18, 2018

(54) CONFIGURING AND OPERATING APPLICATIONS USING A DESCRIPTOR

(71) Applicant: SAP SE, Walldorf (DE)

(72) Inventors: Silke Arians, Hamburg (DE); Volker Driesen, Heidelberg (DE); Iouri Loukachev, Walldorf (DE); Tim Back, Mannheim (DE); Peter Muessig, Untereisesheim (DE); Andreas Hoffner, Waghausel (DE); Markus Cherdron, Muhlhausen (DE); Frank Brunswig, Heidelberg (DE); Alexander Lingg, Heidelberg (DE); Stefan Beck, Hirschberg (DE)

(73) Assignee: SAP SE, Walldorf (DE)

( * ) Notice: Subject to any disclaimer, the term of this patent is extended or adjusted under 35 U.S.C. 154(b) by 420 days.

(21) Appl. No.: 14/982,615

(22) Filed: Dec. 29, 2015

(65) Prior Publication Data
US 2017/0185395 A1     Jun. 29, 2017

(51) Int. Cl.
*H04L 12/24*     (2006.01)
*G06F 8/71*     (2018.01)
*G06F 9/445*     (2018.01)

(52) U.S. Cl.
CPC ............ *G06F 9/44505* (2013.01); *G06F 8/71* (2013.01); *H04L 41/0806* (2013.01)

(58) Field of Classification Search
CPC ...... G06F 8/60–8/66; G06F 8/70; G06F 8/71; G06F 9/445; G06F 9/44505; G06F 9/44536; H04L 41/08–41/0893
See application file for complete search history.

(56) References Cited

U.S. PATENT DOCUMENTS

| 7,428,735 B2 * | 9/2008 | Nog ................... G06F 9/44505 709/217 |
| 7,519,964 B1 * | 4/2009 | Islam ....................... G06F 8/44 717/177 |
| 7,904,421 B2 | 3/2011 | Vitanov et al. |

(Continued)

OTHER PUBLICATIONS

Anonymous, "What is a Cache Buster", Ad Ops Insider [online], 2010 [retrieved Apr. 27, 2018], Retrieved from Internet: <URL: http://www.adopsinsider.com/ad-ops-basics/what-is-a-cache-buster-and-how-does-it-work/>, pp. 1-2.*

*Primary Examiner* — Todd Aguilera
(74) *Attorney, Agent, or Firm* — Fish & Richardson P.C.

(57) ABSTRACT

A system for development, deliver, deployment and operation of an application includes at least one memory including instructions on a computing device and at least one processor on the computing device. The processor is operably coupled to the at least one memory and is arranged and configured to execute the instructions that, when executed, cause the processor to implement an application within a platform associated with a namespace for the platform, where the platform is one platform of a plurality of platforms. The processor implements a descriptor having an identifier that uniquely associates the descriptor with the application, where the descriptor comprises a single file that is platform independent and that includes a plurality of namespaces and application-specific attributes for each of the namespaces to enable the application to operate on multiple different platforms using the same descriptor.

17 Claims, 10 Drawing Sheets

(56) References Cited

U.S. PATENT DOCUMENTS

| | | | |
|---|---|---|---|
| 8,516,453 B2* | 8/2013 | Tripp | G06F 8/433 |
| | | | 717/105 |
| 9,104,444 B2* | 8/2015 | Archer | G06F 9/44505 |
| 9,189,135 B2* | 11/2015 | Chaturvedi | G06F 11/368 |
| 2005/0177711 A1* | 8/2005 | Nog | G06F 9/44505 |
| | | | 713/100 |
| 2009/0055757 A1 | 2/2009 | Chaney et al. | |
| 2009/0158407 A1* | 6/2009 | Nicodemus | H04L 63/20 |
| | | | 726/6 |
| 2011/0088046 A1 | 4/2011 | Guertler et al. | |
| 2011/0276948 A1* | 11/2011 | Tripp | G06F 8/433 |
| | | | 717/126 |
| 2012/0173998 A1* | 7/2012 | Chaturvedi | G06F 11/368 |
| | | | 715/762 |
| 2013/0139126 A1* | 5/2013 | Archer | G06F 9/44505 |
| | | | 717/121 |
| 2013/0254262 A1 | 9/2013 | Udall et al. | |
| 2014/0109043 A1 | 4/2014 | Bolotnikoff et al. | |
| 2014/0379853 A1 | 12/2014 | Shelton | |
| 2017/0329505 A1* | 11/2017 | Richter | G06Q 10/10 |

* cited by examiner

200

Receiving a request to launch an application within a platform associated with a namespace for the platform, where the platform is one platform of a plurality of platforms
202

↓

Responsive to receiving the request to launch the application, accessing a descriptor having an identifier that uniquely associates the descriptor with the application, where the descriptor comprises a single file that is platform independent and that includes a plurality of namespaces and application-specific attributes for each of the namespaces to enable the application to operate on multiple different platforms using the same descriptor
204

↓

Selecting from the plurality of namespaces in the descriptor the namespace for the platform in which the application was launched
206

↓

Retrieving data by the application from the application-specific attributes from the selected namespace in the descriptor
208

↓

Operating the application using the retrieved data
210

Receiving a request from an application at a descriptor for data from application-specific attributes in a requested namespace, the application having a unique identifier
302

Matching the unique identifier from the application to an identifier of the descriptor, where the descriptor comprises a single file that is platform independent and that includes a plurality of namespaces and application-specific attributes for each of the namespaces to enable the application to operate on multiple different platforms using the same descriptor
304

In response to matching the unique identifier from the application to the unique identifier of the descriptor, providing the application the requested data from the application-specific attributes from the requested namespace in the descriptor
306

FIG. 3

```
{
"_version":"1.0",
"id":"954620a2-67a4-40c8-85a0-094f6102da9",
"title": "{{ESS demo}}",
"description": "{{ESS demo assignment package}}",
"entitytype" : "assignmentpackage",
"appDescriptors": [
                {
                        "namespace": "",// provider ID (e.g. remote).
                        "id": "954620a2-67a4-40c8-b3b9-f10d622e6db3" //App descriptor ID
                },
                {
                        "namespace": "",
                        "id": "954620a2-67a4-40c8-8327-4b384c5584af"
                }
],
"groups":[
{
                "namespace": "",
                "id": "954620a2-67a4-40c8-85a0-094f61020db8"
 }
],
"profiles" :[
                {
                        "namespace": "",
                        "id": "954620a2-67a4-40c8-58a0-094f61020daa"
                }
],
"suggestedRolesAssigment": ["DEMO_ACME_AUTH"]
}
```

FIG. 8

CONFIGURING AND OPERATING APPLICATIONS USING A DESCRIPTOR

TECHNICAL FIELD

This description relates to systems and techniques for development, delivery, deployment and operation of an application using a descriptor for the application in a more automated manner.

BACKGROUND

An application may include various stages of a lifecycle. During the stages of the lifecycle, many different users may interface and access the application. Currently, it may be challenging for the various stages of the lifecycle of an application to work with needed resources including libraries and components because the information related to the application may be distributed and/or not accessible in a machine-readable format. It may be desirable to find solutions to the challenges facing the development, delivery, deployment and operation of an application.

SUMMARY

According to one general aspect, a computer-implemented method for development, delivery, deployment and operation of an application includes executing instructions stored on a non-transitory computer-readable storage medium and further includes receiving a request to launch an application within a platform associated with a namespace for the platform, where the platform is one platform of a plurality of platforms. The method include, responsive to receiving the request to launch the application, accessing a descriptor having an identifier that uniquely associates the descriptor with the application, where the descriptor includes a single file that is platform independent and that includes a plurality of namespaces and application-specific attributes for each of the namespaces to enable the application to operate on multiple different platforms using the same descriptor. The method includes selecting from the plurality of namespaces in the descriptor the namespace for the platform in which the application was launched, retrieving data by the application from the application-specific attributes from the selected namespace in the descriptor and operating the application using the retrieved data.

In another general aspect, a computer program product for development, delivery, deployment and operation of an application is tangibly embodied on a non-transitory computer-readable storage medium and includes instructions that, when executed by at least one computing device, are configured to cause the at least one computing device to receive a request from an application at a descriptor for data from application-specific attributes in a requested namespace, where the application has a unique identifier. The computing device is caused to match the unique identifier from the application to an identifier of the descriptor, where the descriptor comprises a single file that is platform independent and that includes a plurality of namespaces and application-specific attributes for each of the namespaces to enable the application to operate on multiple different platforms using the same descriptor and in response to matching the unique identifier from the application to the unique identifier of the descriptor, provide the application the requested data from the application-specific attributes from the requested namespace in the descriptor.

In another general aspect, a system for development, deliver, deployment and operation of an application includes at least one memory including instructions on a computing device and at least one processor on the computing device, where the processor is operably coupled to the at least one memory and is arranged and configured to execute the instructions that, when executed, cause the processor to implement an application within a platform associated with a namespace for the platform, where the platform is one platform of a plurality of platforms. The processor is also caused to implement a descriptor having an identifier that uniquely associates the descriptor with the application, where the descriptor comprises a single file that is platform independent and that includes a plurality of namespaces and application-specific attributes for each of the namespaces to enable the application to operate on multiple different platforms using the same descriptor.

The details of one or more implementations are set forth in the accompanying drawings and the description below. Other features will be apparent from the description and drawings, and from the claims.

BRIEF DESCRIPTION OF THE DRAWINGS

FIG. 2 is an example flowchart illustrating example operations of the system of FIG. 1.

FIG. 3 is an example flowchart illustrating example operations of the system of FIG. 1.

FIG. 8 depicts aspects of an illustrative JSON expression.

DETAILED DESCRIPTION

This document describes systems and techniques for the development, delivery, deployment and operation of an application during its various different lifecycles to enable one or more stages of the lifecycle to be performed in a more automated manner. A descriptor for an application may be used as a technical solution to collect and deliver information during the lifecycle of the application. The descriptor for the application also may be referred to interchangeably as an application descriptor, an app descriptor, or simply as a descriptor. The descriptor provides a central, machine-readable and easy-to-access location for collecting and storing information associated with an application.

During various stages of the application lifecycle, the descriptor may collect information needed for the application in an automated manner. The descriptor may store the collected information for later use by the application during other stages of the application lifecycle including deployment, extensibility, configuration and operation stages. The descriptor may be organized in a structured format and may include information to enable deployment of the application and the descriptor on many different platforms. The descriptor may be platform independent and yet still enable the application to operate on multiple different platforms using the same descriptor.

More specifically, the descriptor for an application is a single file that is platform independent and that is structured to include multiple namespaces and application-specific attributes for each of the namespaces to enable the application to operate on multiple different platforms using the same descriptor. Platform independent means that the same single file is recognized and will work on multiple different platforms. The same single file, which may be read within different platforms, contains platform-dependent information within the file. Specifically, the namespace information and the application-specific attributes enable platform-dependent operation. The application-specific attributes may be populated with values and data during different stages of the application lifecycle including during development, deployment and installation, and during customer-specific configuration. The descriptor may be accessed using an application programming interface (API) to enable changes to be made to the application-specific attributes. Additional details and implementations are described below in the following text and corresponding figures.

Figure 1:
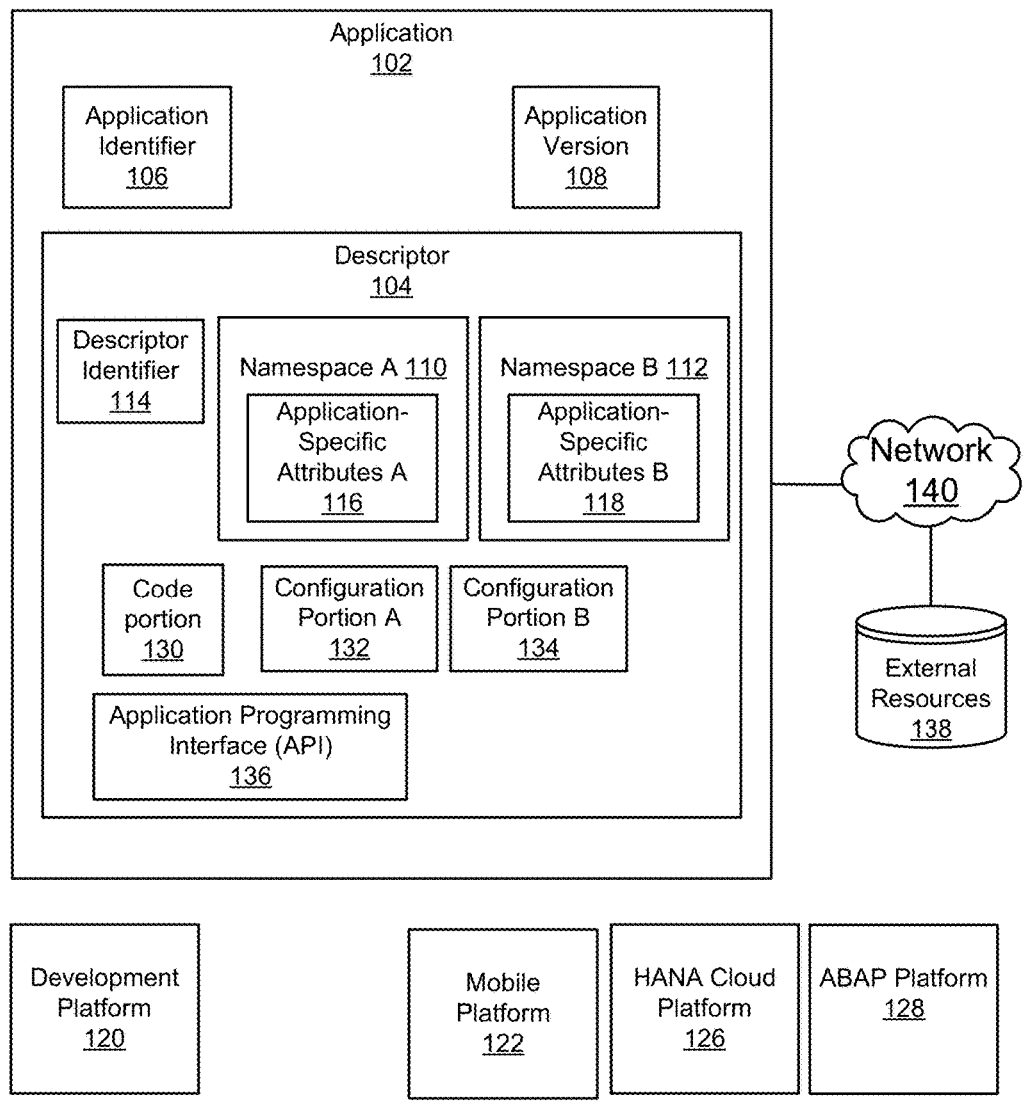
FIG. 1 is a block diagram of a system 100 for development, delivery, deployment and operation of an application.

FIG. 1 is a block diagram of a system 100 for development, delivery, deployment and operation of an application in a more automated manner. The system 100 includes an application 102 and a descriptor 104. The application 102 includes an application identifier 106 and an application version 108. The application 102 may be any type of application that is configured to be deployed to and operate on a computing device, where the computing device includes at least one memory and at least one processor (a microprocessor, a hardware processor, etc.) such that the processor executes the application code (or instructions) that instructs the processor to implement the application 102.

The application 102 includes a web application, which may include user interface applications, content access application, collaborative applications, enterprise applications, and any other type of application. The web application may be deployable on any type of computing device and capable of being run using a browser application on the computing device. The web application also may be a standalone application that runs within an operating system. The web application may be designed to enable end users to accomplish one or more tasks. However, the web application is not limited to end user type applications and may include other types of web applications that may run in the background in an operating system environment or a browser environment without interfacing with an end user.

The application 102 may be perceived as an entity, even if it's content and services are distributed over different system landscapes and different repositories. The application identifier 106 uniquely identifies the application 102. In some implementations, the application identifier 106 includes a unique uniform resource locator (URL). The application identifier 106 enables the application to be uniquely identified and matched with other components and resources using the unique identifier. Additionally, the URL may be presented to an end user as part of a user interface (UI) for selection and launch of the application 102 in various different platforms.

The application version 108 may be used to identify a particular version of the application 102. While the overall application 102 may generally be the same from version to version, each different version may include one or more different features and/or each different version may be configured for different use on different platforms. Each version 108 of the application 102 may be associated with a different descriptor 104. In this manner, the application identifier 106 may uniquely correspond to a particular application version 108 and match to a particular descriptor 104.

While the application identifier 106 and the application version 108 are illustrated in FIG. 1 as separate components of the application 102, it is understood that the application identifier 106 and the application version 108 may be located with other components of the application 102 that may not be illustrated in this figure.

As discussed briefly above, the descriptor 104 includes a single file that is packaged and delivered to a platform along with the application 102. The descriptor 104 provides a central, machine-readable and easy-to-access location for storing metadata associated with the application 102. The data within the descriptor 104 may be structured and formatted in an organized manner. In one example implementation, the data is stored in JavaScript Object Notation (JSON) format and may be structured and organized using multiple namespaces such as Namespace A 110 and Namespace B 112. In this manner, a single descriptor 104 may enable the application 102 to be deployed and operated on different platforms using different namespaces.

The descriptor 104 includes a descriptor identifier 114. The descriptor identifier 114 is a unique identifier that uniquely identifies the descriptor 104. The descriptor identifier 114 is configured to pair with the application identifier 106 and the application version 108. In this manner, the descriptor 104 is uniquely matched and paired with a specific application version 108 using the descriptor identifier 114 and the application identifier 106. In some implementations, the descriptor identifier 114 remain the same when the application 102 has only minor and/or patch versions changes to the application 102 even though the descriptor 104 changes in a compatible way for the minor or patch version. The descriptor 104 and the descriptor identifier 114 may change when the application 102 has major version changes to the application 102.

The descriptor 104 includes multiple namespaces. For example, the descriptor 104 includes a Namespace A 110 and a Namespace B 112. While only two are illustrated in this figure, it is understood that the descriptor 104 may include many more namespaces. Further, the descriptor 104 is extensible to enable the addition of other namespaces as well after creation of the initial namespaces. Examples of namespaces with in the descriptor 104 include an application namespace and platform-specific namespaces. For instance, the namespaces may include the sap.app namespace, the sap.ui namespace and the sap.ui5 namespace. Other namespaces may include the FIORI namespace and other platform-specific namespaces.

Each of the namespaces 110 and 112 include application-specific attributes. For example, namespace A 110 includes application-specific attributes A 116 and namespace B 112 includes application-specific attributes B 118. The application-specific attributes define parameters and include values used by the application 102 for a particular namespace. The application-specific attributes may include both mandatory and optional attributes. Mandatory attributes include attributes that may be needed to enable the application to run with in a particular namespace. Optional attributes include attributes that are not necessary to enable the application to run but may be desirable and/or may be needed to enable the application to operate within a particular namespace. Having all the possible namespaces in one descriptor 104 enables the application 102 to be deployed on multiple different platforms using different namespaces. Examples of namespaces and their application-specific attributes are described in the tables in more detail below.

One or more of the application-specific attributes 116 and 118 may be populated in one or more different stages of the application 102 lifecycle. The lifecycle of the application 102, along with its corresponding descriptor 104, will be discussed in more detail below. The descriptor 104 is designed to pair with the application 102 throughout all stages of the application lifecycle including from initial development stage through the deployment and installation stage and through the configuration and operation stage of the lifecycle. Other stages in the lifecycle are supported as well and the descriptor 104 may be used on an interactive basis in each of the various lifecycle stages.

The application 102 packaged with its corresponding descriptor 104 may be deployed and installed on many different types of platforms. The descriptor 104 is platform agnostic meaning that the descriptor 104 may be implemented and used on different platforms without making changes to the descriptor 104 to enable its execution on the different platforms. At the same time, the descriptor 104 includes platform-specific information with in the various namespaces and the application-specific attributes contained within each namespace. In this manner, the descriptor 104 is a universal-type document because of the flexibility and technical advantages provided to deploying, installing and operating an application 102 on the various different platforms.

The application 102 and its corresponding descriptor 104 may initially be implemented on a development platform 120. The development platform 120 may include a computing device or multiple computing devices on which the application 102 and the descriptor 104 are first developed in the first stage of the application lifecycle. The development platform 120 includes memory and processing resources to enable the interaction, development and creation and validation of the application 102.

The application 102 and its corresponding descriptor 104 also may be deployed on other platforms including a mobile platform 122, an SAP HANA Cloud platform 126 and an Advanced Business Application Programming (ABAP) platform 128. Each of the different platforms may use one or more different namespaces and application-specific attributes for the particular namespace and platform. The descriptor 104 includes all of the information needed for the application 102 to run on each of the platforms and/or within different namespaces on different platforms.

The mobile platform 122 may include running the application 102 on a mobile computing device. On a mobile platform 122, an application 102 may have a different user interface and exhibit different characteristics than when running on other platforms. The descriptor 104 may include a mobile namespace and application-specific attributes directly relevant for the mobile namespace. The mobile platform 122 may be specific to a particular operating system running on a mobile platform and the descriptor 104 may include different namespaces for different mobile operating system platforms.

The descriptor 104 may include a FIORI namespace that may operate on platforms that run on desktop computing devices, tablet computing devices, laptop computing devices, mobile computing devices such as smartphones, wearable devices such as smart watches, etc. The descriptor 104 is used in FIORI applications and in all of the lifecycle phases of a FIORI application. The descriptor 104 includes a FIORI namespace and application-specific attributes directly relevant for the FIORI namespace to run FIORI applications. In this manner, the single descriptor file 104 enables the application 102 to run as a FIORI application on different platforms that support FIORI applications, which may be on different types of computing devices.

The SAP HANA Cloud platform 126 (or simply HANA Cloud Platform) may include a platform running within an application such as a browser application that renders applications using HTML5. The HANA Cloud platform 126 includes its own namespace and application-specific attributes. The descriptor 104 may include an sap.platform.hcp namespace and application-specific attributes directly relevant for the sap.platform.hcp namespace. In this manner, the single descriptor file 104 enables the application 102 to run on a HANA Cloud platform 126, which also may be on different types of computing devices.

The ABAP platform 128 may include a platform running on a computing device that uses programming specifically for this platform. The ABAP platform 128 may use one or more different technologies including the sap.ui technology, the sap.app technology and the sap.ui5 technology. Each of these different technologies may include their own namespace and corresponding application-specific attributes. The descriptor 104 includes namespace is an application-specific attributes for each of these different technologies, which may be utilized by an ABAP platform 128. Other platforms may include different namespaces, where the descriptor 104 includes the namespace and application-specific attributes for the namespace to run on the other platforms.

In some implementations, the descriptor 104 may include a single portion that includes all of the code and configuration parameters needed by the application 102. The single portion may be created during a development lifecycle and added to throughout the other stages of the lifecycle of the application 102. In other implementations, the descriptor 104 may be divided into multiple different portions. For example, the descriptor 104 may include a code portion 130 and one or more configuration portions such as configuration portion A 132 and configuration portion B 134. In this manner, the different portions of the descriptor 104 may exhibit different characteristics and may be created during different stages of the application lifecycle.

The code portion 130 may be created with the application 102 at development and may be secured as a read-only document after delivery of the application 102 and the descriptor 104. The code portion 130 may include one or more components including the application name (Name), version, the deployment uniform resource identifier (URI) and gateway services. The code portion 130 may be delivered within the application archive. The code portion 130 may be created by the developer and extended by the test and assembly steps, which may be prior to deployment and installation at a customer. During assembly, the content of the code portion 130 is extracted from the document, which is needed on the marketplace, application store and other entities to enable discovery of the application and deployment planning.

The configuration portions 132 and 134 may include customer-specific data and may be write-enabled to enable changes to the customer-specific data even after deployment to the customer. Each configuration portion 132 and 134 references only a single code portion 130. There may be many configuration portions to just a single code portion. The configuration portions 132 and 134 may be specific even within a same customer to various users and access levels for various users within the same customer. There can be many instances of the same application that are configured differently. Thus, there is a one-to-many relationship between the code portion 130 and the configuration portions 132 and 134.

The configuration portions 132 and 134 may collect the settings during the various different application life cycle stages including deployment, configuration and extensibility. As mentioned, the configuration portions 132 and 134 are write-enabled for the customer. In some instances, some customers may not store configured parameters in a configuration document but in its own repositories such as a layered repository. The remotely-stored parameters are merged with the delivered descriptor 104 at consumption and operation time.

The descriptor 104 also includes an application programming interface (API) 136. The API 136 may enable different types of interfacing for the descriptor 104 and the application 102. For example, the API 136 enables access to the configurable portions of the descriptor 104 whether the document is a single portion or multiple portions that includes separate configuration portions 132 and 134. In this manner, changes to the descriptor 104 may be made through the API 136 at different points in the application lifecycle.

Also, for example, the API 136 enables the application 102 and the descriptor 104 to interface with other resources. In this manner, the application 102 itself may be used as an API for access to other resources.

The various platforms and computing devices discussed above, including the external resources 138, all may be connected through a network 140. The network 140 may include a wired and/or wireless network such as the Internet. The application 102 and the descriptor 104 may be deployed on the various different platforms through the network 140.

FIG. 2 is an example flowchart illustrating example operations of the system 100 of FIG. 1. The example flowchart illustrates an example process 200. Process 200 includes a method for development, delivery, deployment and operation of an application, such as application 102 of FIG. 1, in a more automated manner. Process 200 includes receiving a request to launch an application within a platform associated with a namespace for the platform, where the platform is one platform of a plurality of platforms (202). For example, the application 102 may be deployed on one of the platforms 122-128, as illustrated in FIG. 1. An end user or another entity may initiate a request to launch the application 102. The application 102 receives the request from within the particular platform and its associated namespace.

Process 200 includes accessing a descriptor having an identifier that uniquely associates the descriptor with the application in response to receiving the request to launch the application (204). The descriptor includes a single file that is platform independent and that includes a plurality of namespaces and application-specific attributes for each of the namespaces to enable the application to operate on multiple different platforms using the same descriptor (204). With respect to FIG. 1, in response to the application 102 receiving the request to launch the application 102, the application accesses the descriptor 104. The application 102 accesses the descriptor 104 because the descriptor is the single location containing all of the information and references needed by the application 102 to run on the particular platform associated with a particular namespace or namespaces. The descriptor 104, as described above, includes the application-specific attributes needed to run the application 102.

As described above, the descriptor 104 includes a descriptor identifier 114 that uniquely associates the descriptor 104 with the application 102. In some instances, the application includes multiple different versions and each of the versions of the application is associated with a different descriptor and the descriptor identifier 114 uniquely associates the descriptor with one of the versions of the application.

Process 200 includes selecting from the plurality of namespaces in the descriptor the namespace for the platform in which the application was launched (206). As described above, the descriptor 104 includes multiple different namespaces such as namespace A 110 having application-specific attributes A 116 and namespace B 112 having application-specific attributes B 118. The application 102 selects from among the namespaces contained within the descriptor 104 based on the platform and namespace in which the application was launched.

Process 200 includes retrieving data by the application from the application-specific attributes from the selected namespace in the descriptor (208). For example, as just discussed, each of the namespaces 110 and 112 include separate application-specific attributes such as application-specific attributes A 116 and application-specific attributes B 118. The application 102 retrieves the data from the application-specific attributes based on the selected namespace in the descriptor 104 that corresponds to the namespace in which the application is currently being operated. The application-specific attributes contain values that may have been added at one of the various different stages of the application lifecycle.

Process 200 may optionally include updating one or more of the application-specific attributes of the descriptor using the API 136.

Process 200 includes operating the application using the retrieved data (210). For example, once the application has retrieved the data from the descriptor 104, then the application operates and runs on the selected platform using the retrieved data.

FIG. 3 is an example flowchart illustrating example operations of the system 100 of FIG. 1. The example flowchart illustrates an example process 300. Process 300 includes a method for development, delivery, deployment and operation of an application, such as application 102 of FIG. 1, in a more automated manner. Process 300 includes receiving a request from an application at a descriptor for data from an application-specific attributes in a requested namespace, where the application includes a unique identifier (302). In this example process 300, the application 102 may send a request to the descriptor 104 for data contained in the descriptor 104. The descriptor 104 receives the request from the application 102 for the data which, as described above, may be contained within a particular namespace having application-specific attributes. The application 102 includes the application identifier 106 which uniquely identifies the application 102.

Process 300 includes matching the unique identifier from the application to an identifier of the descriptor, where the descriptor includes a single file that is platform independent and that includes a plurality of namespaces an application-specific attributes for each of the namespaces to enable the application to operate on multiple different platforms using the same descriptor (304). As discussed with respect to FIG. 1, the descriptor also includes a unique identifier referred to as the descriptor identifier 114. The descriptor identifier 114 is matched to the application identifier 106 such that the application 102 obtains the desired data from the correct descriptor 104.

In response to matching the unique identifier from the application to the unique identifier of the descriptor, the descriptor provides the application the requested data from the application-specific attributes from the requested namespace in the descriptor (306). With respect to FIG. 1, the descriptor 104 provides the application 102 the requested data from the specific application-specific attributes corresponding to the desired namespace that the application 102 is currently operating within.

Figure 4:
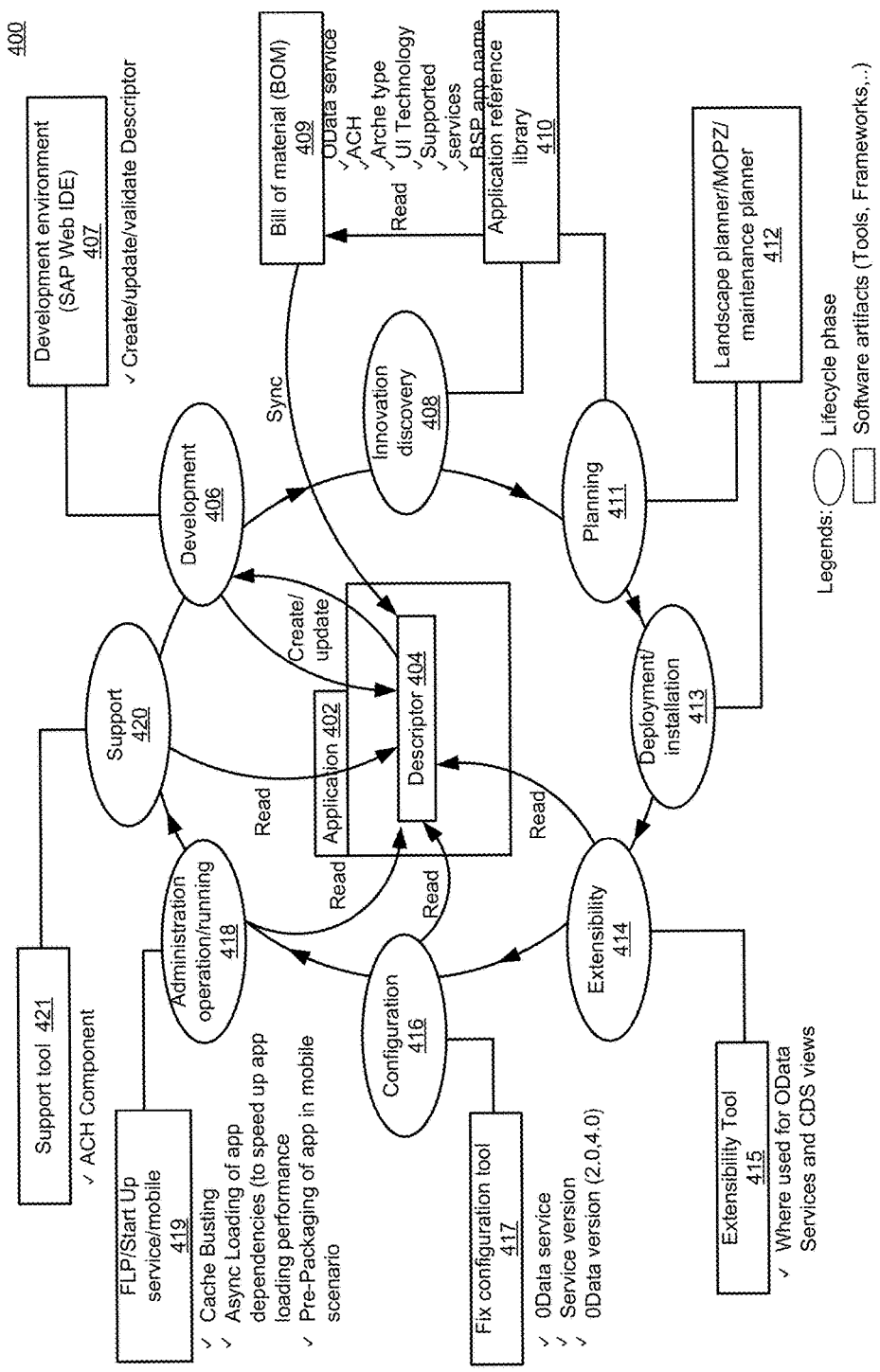
FIG. 4 is an example diagram illustrating an example application and descriptor lifecycle.

FIG. 4 is an example diagram 400 illustrating an example application and descriptor lifecycle. Diagram 400 includes an example application 402 and an example descriptor 404. The application 402 may include all of the features and characteristics described above with respect to application 102 of FIG. 1. The descriptor 404 includes all of the features and characteristics of the descriptor 104 of FIG. 1.

During each of these life cycle stages, the application 402 and the descriptor 404 are considered as an entity. During the various lifecycle stages (or phases), other software artifacts including applications, tools, frameworks and other artifacts may interface with the descriptor 404 and the application 402. Some of the various stages include writing and reading from the descriptor 404. Other stages may include only reading from the descriptor 404.

The first stage in the lifecycle is the development stage 406. The development stage 406 may use a development environment software application 407 in order to create the initial content for the descriptor 404. The development environment software 407 may be used to create, update and validate the descriptor 404. In some implementations, the development environment software 407 may include a tool such as a wizard to initially develop the content. The parameters may be descriptive or configuration relevant. As discussed above, if the descriptor 404 includes separate code portions and configuration portions, then the descriptive parameters may be coded as part of the code portion and the configuration relevant parameters may be coded as part of the configuration portion. However, if the descriptor 404 includes only a single portion, then the descriptive or configuration relevant parameters may all go in a single document within the descriptor 404.

Changes in the content of the descriptor 404 may be limited by infrastructure or checks to ensure compatibility. Changes also may be used to determine the need for regression testing and Delta configuration. During the maintenance period of the application, the application may go through testing against the supported different versions of the infrastructure. Information gleaned during the testing may be used to improve the management of compatibility and interoperability and also may be used to constrain the version supported at the customer. Some parameters may only be added at assembly time and not during the development stage 406.

The next stage in the lifecycle of the application 402 is the innovation discovery stage 408. The innovation discovery stage 408 may include a bill of materials 409 and an application reference library 410. The innovation discovery stage 408 provides the information to enable customers to search for the application 402 and information related to the application in a particular portal. The information provided on the portal can partially be derived from the information in the descriptor 404. The content may be taken from the bill of materials editor 409 and the application reference library 410. The data relevant for innovation discovery may be extracted from the descriptor 404 and synchronized to the bill of materials editor 409.

Linked to the innovation discovery stage 408 is the planning stage 411. Software tools such as a landscape planner 412 may be used to further include and map application-specific attributes to the descriptor 404. The information is provided by the descriptor 404 on an application level. In case of an ABAP deployment, this is mapped to the deployment granularity in the namely the software component. The result of the planning stage 411 is a deployment plan, which can be consumed by the tools to configure the target released software component version stack. Also, though data services may be delivered via correction packages a management of the deployment dependencies on a correction packages level also may be included during the planning stage 411. In this situation, the descriptor 404 contains a correction package identifier that is delivered with the descriptor 404 during deployment.

Following the planning stage 411, the next stage in the life cycle is the deployment/installation stage 413. During the deployment and installation stage 413, the application 402 and the packaged descriptor 404 are deployed to a particular platform, such as the platforms described with respect to FIG. 1. The application 402 and the descriptor 404 may be delivered and deployed to a particular platform over a network.

Following the deployment and installation stage 413, the next stage is the extensibility stage 414. The extensibility stage 414 may include an extensibility tool 415. Extensibility enables the deployed application 402 and the descriptor 404 to be extended by a customer including adding additional namespaces with application-specific attributes. Extensibility may per provide an extension from the persistency to the user interface. The artifacts involved in the process are accessible either directly in the descriptor 404 or as information, which can be retrieved from the parameters in the descriptor 404. The extensibility stage 414 also may get a link from the application to the bow data service and vice versa from the Open Data Protocol (OData) service to the applications that use it. The descriptor 404 may provide the necessary information to enable this exchange of information between the application and the OData service.

The configuration stage 416 reads data from the descriptor 404 using a fix configuration tool 417. The parameters in the descriptor 404 that are for run time or configuration may be created and populated during the configuration stage 416. In one example implementation, the configuration information is overlaid with the more permanent code information and the overlaid queue is used during the runtime stage. Other tools (not shown) may be used to write deltas to the descriptor 404 via a layered repository.

Following the configuration stage 416, the next stage is the administration, operation and running stage 418. As discussed above with respect to the processes 200 and 300 of FIG. 2 and FIG. 3, the application 402 reads the necessary information from the descriptor 404. The information needed by the application 402 has been populated in the descriptor 404 during the previous stages of the life cycle. The operation stage of the application 418 may include software artifacts such as FIORI Launchpad/startup service/mobile 419 to enable user selection of the application in order to launch the application 402. Through the API, all transitive dependencies of an application can be calculated as well as a cachebuster token for the application and per dependency, which enables asynchronous loading of these resources in order to speed up the start up performance of an application. The API for the transitive dependencies is also used in the mobile packaging scenario in order to find all to be packaged resources for an application.

A final stage in the life cycle is the support stage 420. The support stage 420 may include a support tool 421. The support tool 421 may include a user interface from which an incident can be created. The descriptor 404 provides information about the application component hierarchy where the incident should be posted. In addition, the configuration portion of the descriptor 404 may provide a first level of information about the application 402 at the customer system.

Figure 5:
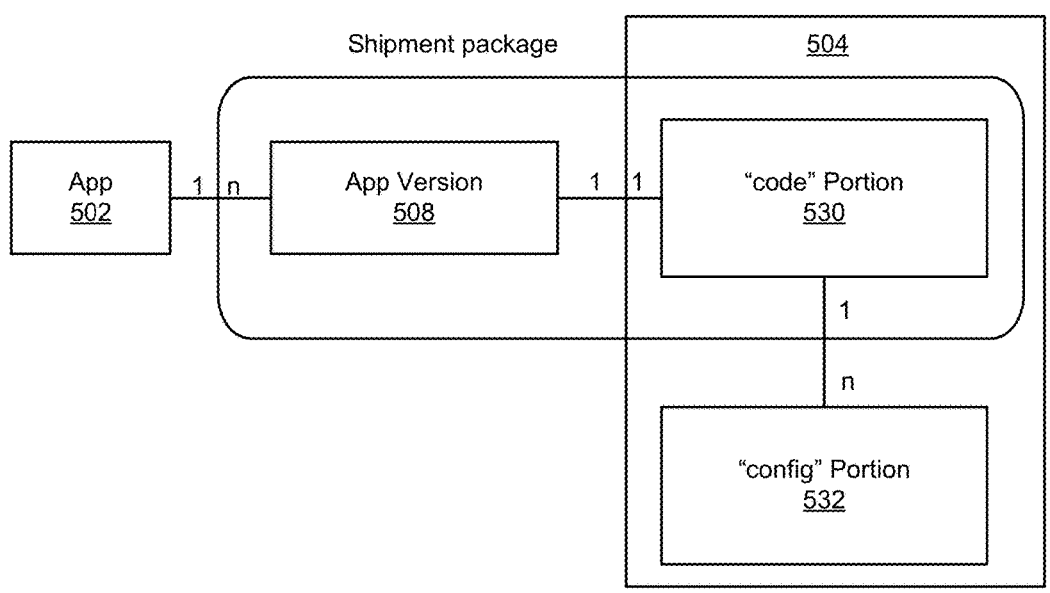
FIG. 5 is an example diagram illustrating an example application and descriptor shipment package.

FIG. 5 is an example diagram illustrating an example application and descriptor shipment package. The application 502 includes all the features and characteristics of the application 102 of FIG. 1. The descriptor 504 includes all of the features and characteristics of the descriptor 104 of FIG. 1. The shipment package 500 is an example of an application 502 having an application version 508 being packaged together with a descriptor 504 having two descriptor portions, namely the code portion 530 and the configuration portion 532. The shipment package 500 provides an illustration of the descriptor 504 having both a code portion 530 and a configuration portion 532. As discussed above, the code portion 530 may be created at the vendor and may be read-only afterwards at the customer. The configuration portion 532 may be created and filled at the customer during deployment, configuration, administration or use. The originally shipped code portion 530 may not be modified at the customer systems. During an update of the application 502, the code portion 530 is overridden. On the other hand, the configuration portion 532 may not be overwritten but may be changed and/or modified as necessary. During run time or operation, a merged document is used meaning the runtime document contains data of the code portion 530, the configuration portion 532 and of the parameters stored in other tables or infrastructures as referenced within the descriptor 504.

To achieve a merged-type of document, and overlay mechanism may be used in order to merge the appropriate content together for use by the application 502. The overlay mechanism may include one or more merge rules to define how the changes and delivered contents are merged for use during operation. The merge rules may define when content is replaced meaning that the original is not seen, content is overlaid meaning that the original is accessible read only via the API, or content is extended meaning access gives the supercenter the content to both the code portion 530 and the configuration portion 532.

As discussed above, one application 502 may be deployed in one or more application versions 508. Each application version 508 includes one code portion 530 and potentially multiple different configuration portions 532.

Figure 6:
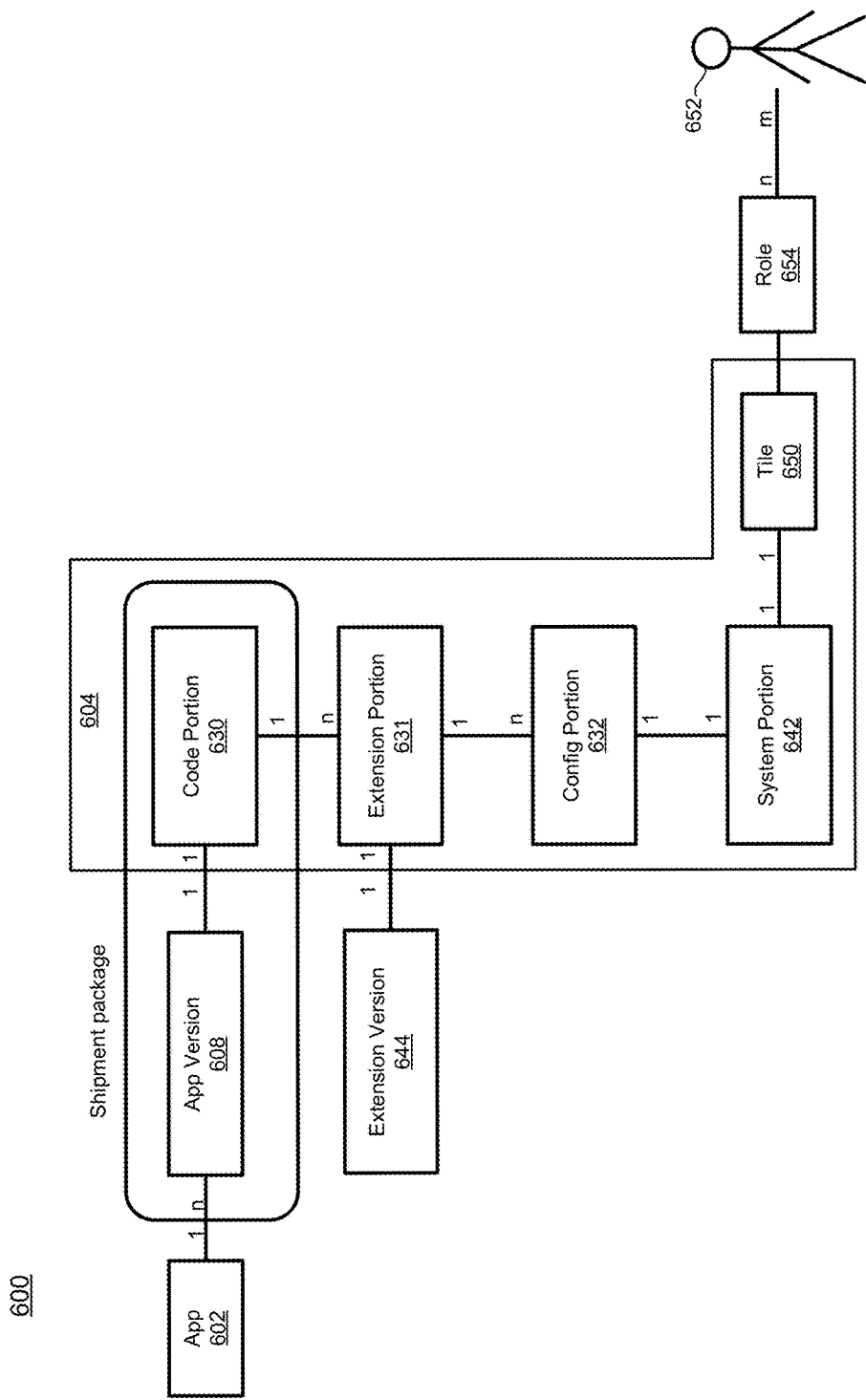
FIG. 6 is an example diagram illustrating an example application and descriptor shipment package with extension.

FIG. 6 is an example diagram illustrating an example application and descriptor shipment package with extension. The shipment package 600 is an example of an application 602 and a descriptor 604, where the descriptor 604 includes a code portion 630, an extension portion 631 and a configuration portion 632. In this example, the descriptor 604 also includes a system portion 642. The application 602 includes an application version 608. The application 602 includes all the features and characteristics of the application 102 of FIG. 1. The descriptor 604 includes all of the features and characteristics of the descriptor 104 of FIG. 1.

In this example, the descriptor 604 includes an extension portion 631 which is a client independent (or customer independent) portion of the descriptor 604. As referenced in the life cycle diagram of FIG. 4, the extension portion may be created and populated in the descriptor 604 during the extensibility stage of the lifecycle. The extension portion 631 may include an extension version 644. The extension version 644 may define if there are more than one extension to match an extension with a particular application version 608.

An optional system portion 642 may be created if there are system wide settings that may apply across various run time technologies and namespaces. In other instances, the settings in the system portion 642 may be included in one of the other portions such as the code portion 630.

Each of the configuration portions 632 may be represented by a tile 650. In this example, the one configuration portion 632 is referenced by the tile 650. In other examples where there multiple configuration portions, then multiple corresponding tiles may be instantiated as part of the descriptor 604. The tile 650 may be a visible selector such as a link or URL within a user interface that may be selected by a user such as user 652. For each tile within a user interface, one descriptor 604 is assigned. The content for the tile may be an overlay of the content of the different documents. The overlay mechanism may include the system portion 642, then configuration portion 632, then extension portion 631 and then the code document 630. Upon usage in the various different runtimes, the content of the documents are overlaid on the content according to the more merge rules. Access to the tile by a particular user 652 may be role dependent 654 Such that access is governed by a particular role for the user 652.

Referring back to FIG. 1, the descriptor 104, as discussed above, includes multiple namespaces with their corresponding application-specific attributes. Below are example namespaces and corresponding tables of application-specific attributes.

One namespace is an application namespace. An example of the application namespace is the sap.app namespace. The application namespace may include the following application-specific attributes. Table 1 below describes the attributes in the application namespace, which are attributes that are independent of which user interface technology is use.

TABLE 1

| Attribute | Description |
| --- | --- |
| Id | Mandatory attribute: Unique identifier of the app, which must correspond to the component ID/namespace i note The ID must be unique and must correspond to the component ID/namespace. |
| Type | Possible values: application, component, library |
| i18n | file with attributes inRelative URL to the properties file that contains the text symbols for the descriptor; default: "i18n/i18n.properties" |
| applicationVersion | Mandatory attribute |
| Embeds | Array of relative paths to the nested manifest.json files; attribute is mandatory if a nested manifest.json exists |
| embeddedBy | Relative path back to the manifest.json file of an embedding component or library; attribute is mandatory for a nested manifest.json |
| Title | Mandatory attitute: The entry is language-dependent and specified via {{ . . . }} syntax |

TABLE 1-continued

| Attribute | Description |
|---|---|
| Description | Description; language-dependent entry that is specified via {{ . . . }} syntax |
| Tags | Containing an array of language-dependent keywords that are specified via {{ . . . }} syntax |
| Ach | Application component hierarchy; attribute is mandatory for SAP apps |
| dataSources | Unique key/alias for specifying the used data sources; contains the following information:<br>    uri: Mandatory relative URL in the component; takes embeddedBy into account, if filled, or the server absolute of the data source, for example"/sap/opu/odata/snce/PO_s_sRv; v=2/"<br>    type:OData(default)\|ODataAnnotation\|INA\|XML\|JSON<br>    settings: Data source type-specific attributes (key, value pairs), such as:<br>        odataVersion: 2.0 (default), 4.0<br>        localUri: Relative URL to local metadata document or annotation uri<br>        annotations: Array of annotations which references an existing data source of type "ODataAnnotation" under sap.app/dataSources |
| cdsViews | Array of directly used CDS views; only added if used via INA protocol directly, and not added if used via OData service |
| Offline | Indicates whether the app is running offline (true, false (default)) |
| sourceTemplate | If an app has been generated from a template, this attribute is filled automatically by the generation tool (SAP Web IDE):<br>    id: ID of the template from which the app was generated<br>    version: Version of the template from which the app was generated |
| openSourceComponents | name: Name of the open source component<br>version: Required if the open source component is part of the app; not required if the open source component is part of the SAPUI5 dist layer<br>packagedWithMySelf: Indicates if the open source component is part of the app (true) or not (false) |
| crossNavigation | Cross-navigation for specifying inbounds and outbounds<br>    scopes: Scope of a site<br>    sapSite<br>    inbounds: Unique key or alias to specify inbounds (mandatory); contains:<br>        semanticObject (mandatory)<br>        action (mandatory)<br>        icon: Used to overwrite sap.ui/icons/icon<br>        title: Used to overwrite sap.app/title(language-dependent entry to be specified via {{ . . . }} syntax)<br>        indicatorDataSource; specifies the data source; contains:<br>            dataSource: reference tosap.app/dataSources (mandatory)<br>            path: Relative path tosap.app/dataSources<br>            uri (mandatory)<br>            refresh: Defines the refresh interval<br>        deviceTypes: Contains objects with device types on which the app is running; if empty, use the default from sap.ui/deviceTypes; the following device types can be defined (true/false):<br>            desktop<br>            tablet<br>            phone<br>      signature: Specifies the signature; contains:<br>        parameters (mandatory): Contains parameter names with the following information:<br>          required (true/false)<br>          filter: Represents the filter only if the input parameter matches the filter; with mandatory attributes value and format ("plain", "regexp", "reference")<br>          defaultValue: Specifies the default value; has mandatory attirbutes value(depending on the format this is a verbatim default value) and format ("plain", "reference")<br>          additional Parameters (mandatory): Indicates, how additional parameters to the declared signature are handled; values can be, for example, "ignored", "notallowed", "allowed"<br>    outbounds: Specifies outbounds with a unique key or alias containing:<br>        semanticObject (mandatory) |

TABLE 1-continued

| Attribute | Description |
|---|---|
| | action (mandatory)<br>parameters: Specifies the parameters containing the parameter name with an empty object |

Table 2 below illustrates the example application-specific attributes in a UI namespaces, specifically the sap.ui namespace, which include attributes that are general user interface technology attributes independent of the user interface technology used.

TABLE 2

| Attribute | Description |
|---|---|
| Technology | Specifies the UI technology; value is UI5 |
| Icons | Contains object with app-specific icons, for example:<br>icon: Icon of the app<br>favIcon: ICO file to be used inside the browser and for desktop shortcuts<br>phone: 57 × 57 pixel version for non-retina iPhones<br>phone@2: 114 × 114 pixel version for retina iPhones<br>tablet: 72 × 72 pixel version for non-retina iPads<br>tablet@2: 144 × 144 pixel version for retina iPads |
| deviceTypes | Mandatory; contains objects with device types on which the app is running, such as:<br>desktop: Indicator for whether desktop devices are supported, true, false<br>tablet: Indicator for whether tablet devices are |
| supportedThemes | Mandatory, array of supported SAP themes, such as sap_hcb.sap_bluecrystal |

Table 3 below illustrates the example application-specific attributes in the sap.ui5 namespace.

TABLE 3

| Attribute | Description |
|---|---|
| Resources | Relative URLs in the component, takingembeddedBy into account if filled, pointing to js (JavaScript) and cssresources that are needed by the app for specifying the uri and an id(optional) for CSS. The JavaScript files are loaded by the raquiremechanism. The CSS files are added to the head of the HTML page as a link tag. The resources are resolved relative to the location of the manifest.jsonfile. |
| Dependencies | Specifies the external dependencies that are loaded by the SAPUI5 core during the initialization phase of the component and used afterwards, such as libraries or components:<br>minUI5Version: Minimum version of SAPUI5 that your component requires; this information ensures that the features of the SAPUI5 runtime version of the component are available. As SAPUI5 does not currently enforce use of the correct version, theminUI5Version is used for information purposes only. If the minimum SAPUI5 version criteria is not fulfilled, a warning is issued.<br>libs: ID (namespace) of the libraries that the SAPUI5 core should load for use in the component.<br>components: ID (namespace) of the components that theSAPUI5 core should load for use in your component. |
| Models | Defines models that should be created or destroyed along the component's lifecycle. The key represents the model name. Use an empty string ("") for the default model.<br>type: Model class name<br>uri: Relative URL in the component; Array of directly used open source libraries for documentation purposes; not used when open source libraries are used via SAPUI5<br>capsulation: embeddedByArray of directly used open source libraries for documentation into account if filled, or server absolute for model<br>settings: Object that is passed to the model constructor<br>dataSource: String of key or alias from sap.app dataSources to reference an existing data source; the type,uri and settings properties are set according to the data source's type, uri andsettings (if not already defined). If the type undersap.app dataSources isOData, an OData Model V2 is created automatically. If you need an OData Model V1, specify the type as well. |
| rootView | Specifies the root view that shall be opened; can be the view name as a string for XML views, or the view configuration object with viewName for the view name as a string and type for the type (enumeration ofsap.ui.core.mvc.ViewType) and other properties ofsap.ui.core.mvc.view. |
| handleValidation | Possible values: true or false(default); used to enable or disable validation handling by the message manager for this component, seeMessage Manager |

TABLE 3-continued

| Attribute | Description |
| --- | --- |
| Config | Static configuration; specify the name-value pairs that you need in your component. |
| Routing | Provides configuration parameters for route and router, see Routing and Navigation |
| Extends | Used to extend another component.<br>component: ID (namespace) of the component being extended<br>minVersion: Specifies the minimum version of the component being extended, for information purposes if your app requires a minimum version of the component<br>extensions: Component or view extensions, which enable you to replace and extend views and controllers and also to modify the views, seeExtending Apps |
| contentDensities | Mandatory; contains an object with the content density modes that the app supports, see Content Densities<br>compact: Mandatory; indicates whether compact mode is supported (true, false)<br>cozy: Mandatory; indicates whether cozy mode is supported (true, false) |
| resourceRoots | Map of URL locations keyed by a resource name prefix; only relative paths inside the component are allowed and no ".." characters<br>This attribute is intended for actual sub-packages of the component only, meaning that it must not be used for the component namespace itself. The defined resource roots will be registered after the component controller is loaded and do not affect the modules being declared as dependencies in the component controller. |

It is understood that the above three table are merely examples of the namespaces and application-specific attributes that may be contained in the descriptor 104.

Figure 7:
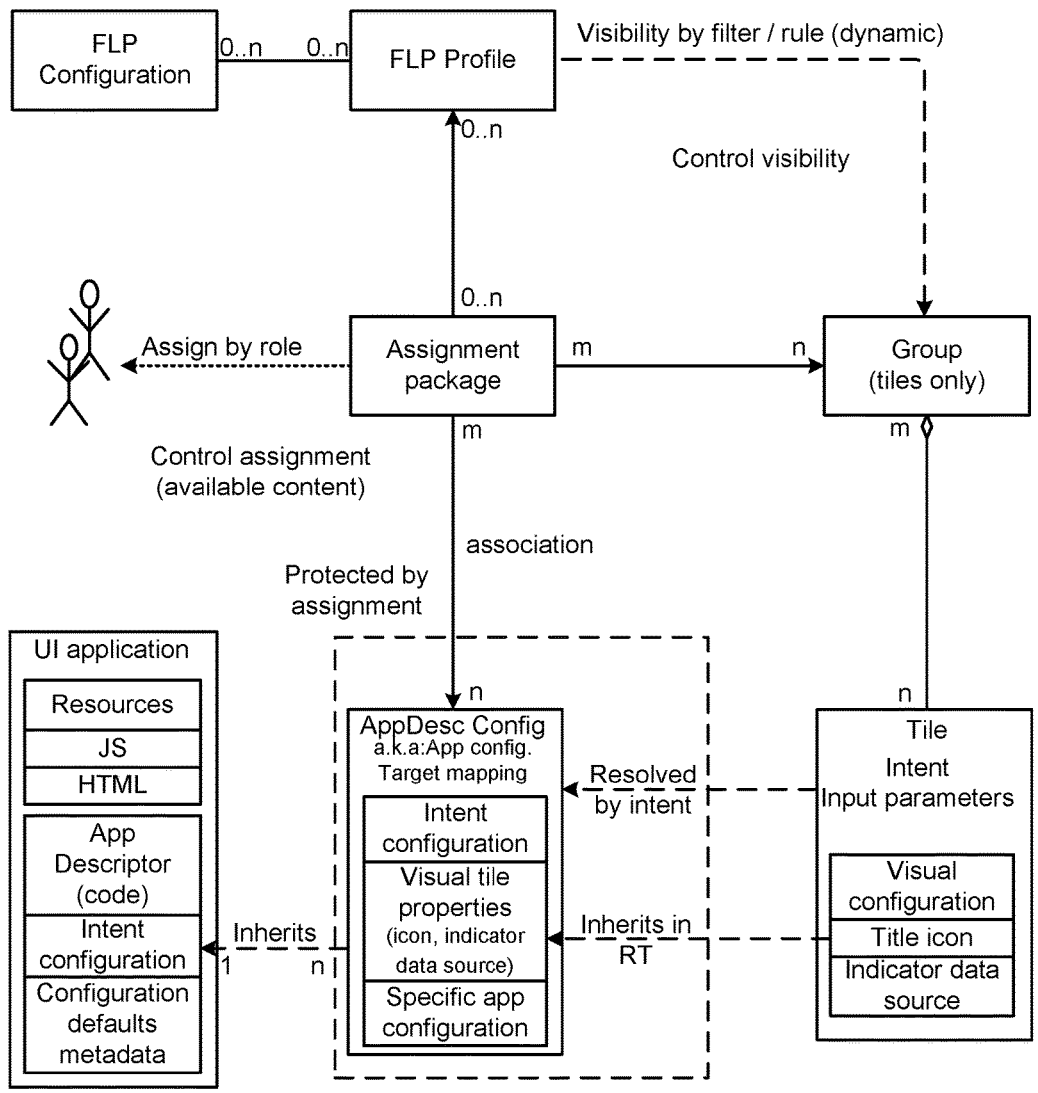
FIG. 7 presents aspects of an illustrative logical content model.

Aspects of the descriptor that was described above may leverage any number of data, content, etc. models. FIG. 7 presents a portion of one such illustrative model.

Aspects of the descriptor that was described above may be expressed through any number of artifacts. FIG. 8 presents a portion of one such illustrative (JSON) expression.

Aspects of the descriptor that was described above may be augmented, enhanced, etc. in any number of ways. As just one example, consider a TargetMapping capability.

In an SAP Fiori environment users are typically granted permissions to work in various roles on various business-related tasks. Based on those permissions and roles, developed and configured Fiori applications must be assigned. In almost all cases a customer will want or need to adapt the Fiori applications as shipped to the specific needs of their dedicated users. Nevertheless, to assure that the notion of a task or an operation on any business object such as a Purchase Order is done consistently between different users, the concept of intent-based navigation was introduced with FIORI. This allows users and business administrators to collaborate without needing to distinguish the various permissions and roles and individual user may have. Different users may need access to different information when displaying a Factsheet of a PurchaseOrder, yet they all share the same intent. Some users may be using a mobile device, some may be need to access the PO in a classic desktop environment, some may need a country specific version, and some may not be allowed to see all fields due to lack of authorization privileges.

In an SAP FIORI environment all navigation is based on Intents. A tile in a FIORI Launchpad represents such in intent. But also links in a search result or links in an application express an intent. Each intent is mapped to an application using a TargetMapping. In order to support various UI and application technologies, TargetMappings are designed to support inter alia any number of application types including for example native, web-based, hybrid, container-based, HTML5, etc.

An administrator may dynamically assign applications to users through TargetMappings. TargetMappings are customizable in a modification-free manner, which allows a customer to adapt aspects of a shipped application without modification.

Figure 9:
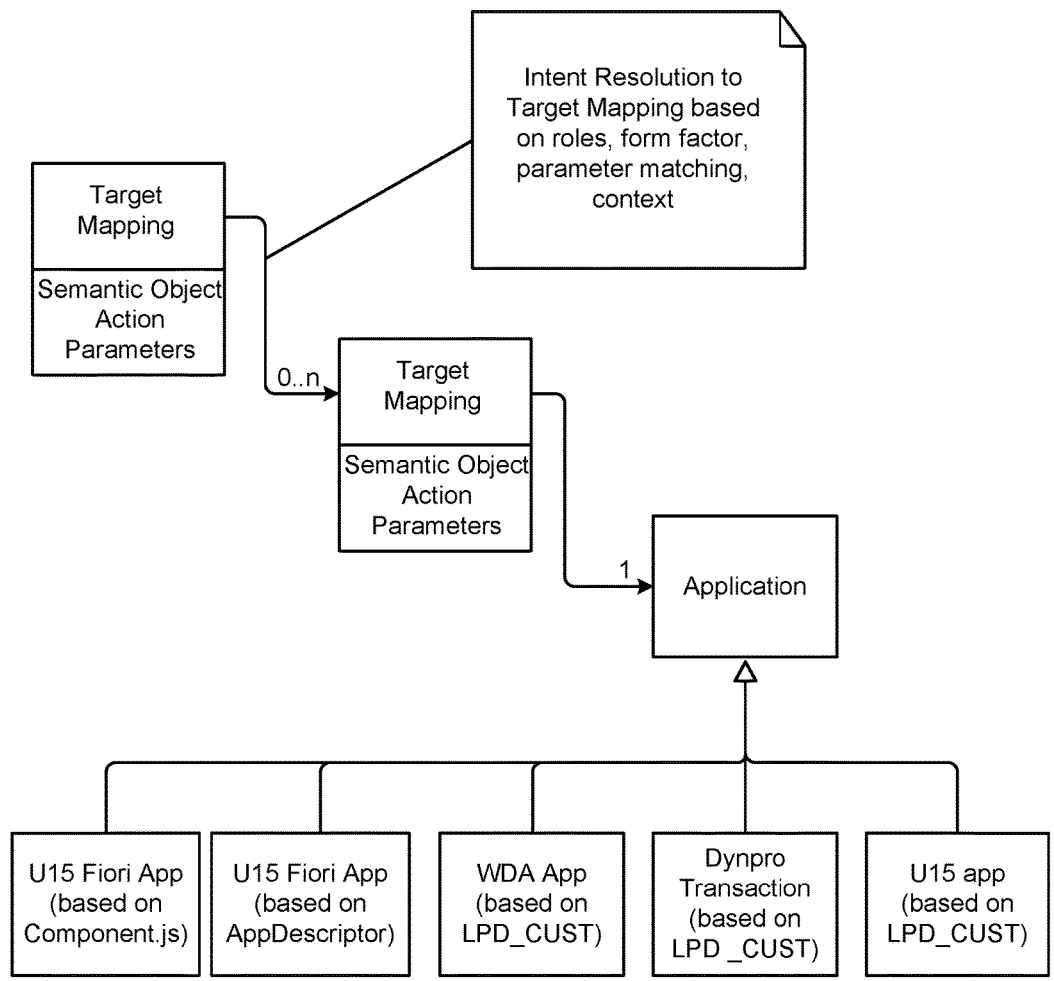
FIG. 9 presents illustrative relationships that may be possible in accordance with some embodiments.

TargetMappings map or associate an intent to a specific application. For example, if a customer wishes to start an application with any specific parameters, such as start parameters or system aliases, then a TargetMapping may be employed. Additionally, because TargetMappings are assigned to users based on inter alia role assignments, it is easily possible to have a single application serve multiple use cases of different roles. Since such role assignments are frequently specific to the business processes and organizational structures of each customer, it is mandatory that such tasks do not require coding or modification. See for example FIG. 9.

Among other things TargetMappings may leverage aspects of the descriptor that was described above.

During TargetMapping assignments, associations, etc. an administrator may take into account among other things various technical and security constraints (such as system landscape, language, country, industry, etc.) and various business constraints (such as permissions, roles, etc.) and may among other things arrive at a visual configuration of a FIORI Launchpad including inter alia Tiles, Homepage Groups, Tile catalogs, etc.

When for example a user accesses a FIORI Launchpad they may see all of the Tiles, which reflect the intents of the available applications, for which the user has been authorized. If a user does not have any TargetMappings or permissions for certain applications, the associated Tiles will not be displayed. Therefore, users only see Tiles for applications they are allowed to use. This detection may also be device specific, so if a TargetMapping is only defined for a desktop device, but the user is accessing a FIORI Launchpad on a mobile device, then the appropriate Tile(s) will also not be available.

If an intent can be properly resolved based on a TargetMapping, not only is the application to be started determined, but also, which configuration to start the application with. For example, on a mobile device form factor an administrator may specify to hide certain parts of an application, assuming that the application supports such parametrization. Accordingly, a TargetMapping may be used in support of the variant-based instantiation of applications. A single application may expose multiple variants, with each variant configured via TargetMapping parameters.

Figure 10:
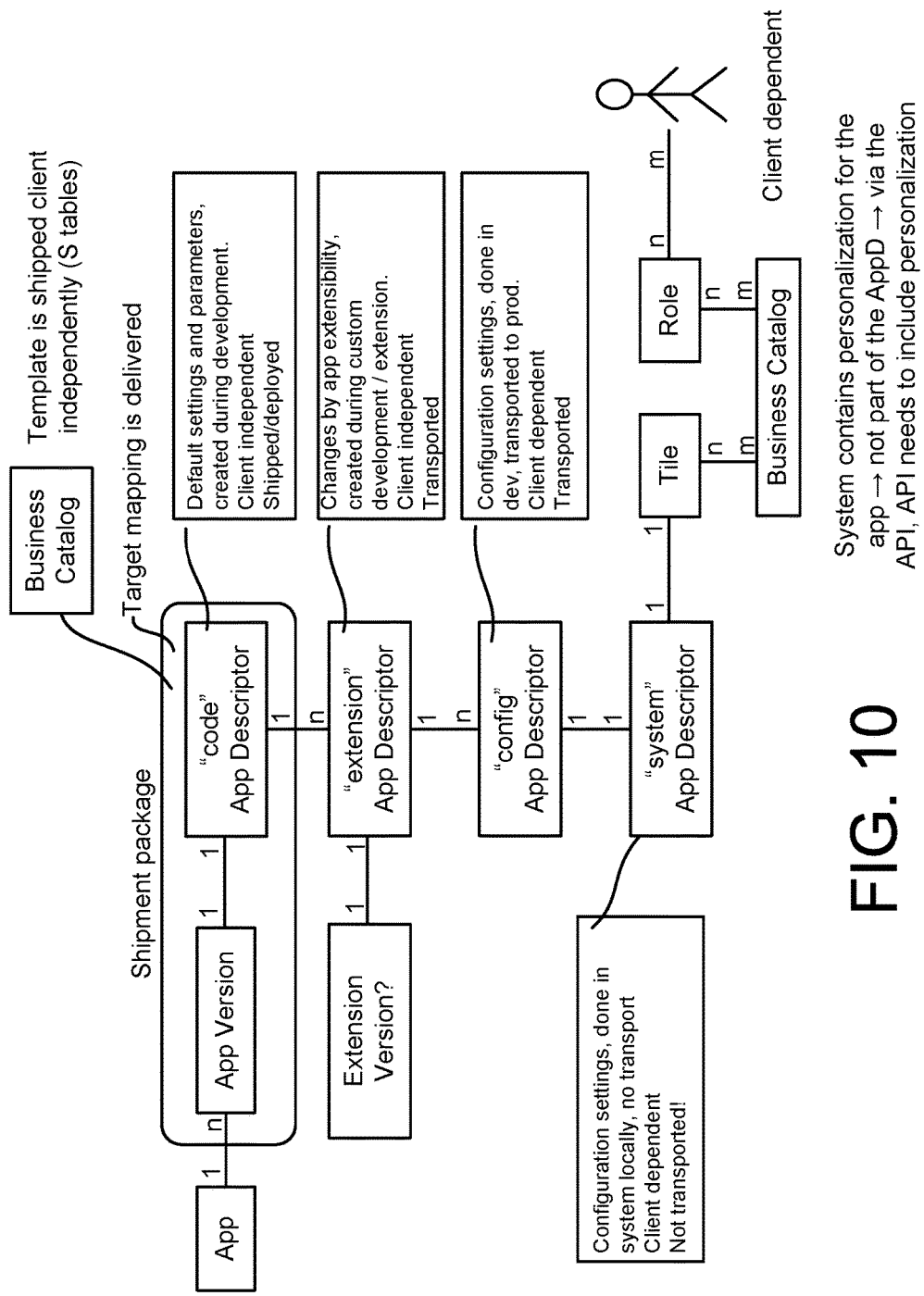
FIG. 10 presents illustrative relationships that may be possible in connection with a TargetMapping capability.

FIG. 10 depicts how aspects of all of the above may be expressed, organized, etc. where for example:

1) AppDescriptor is, as described above, a neutral (e.g., technology, etc. independent) mechanism that may inter alia describe the declarative aspects of an application.
2) AppDescriptor Code represents the resources, etc. associated with a specific instance of an AppDescriptor.
3) AppDescriptor Config represents declarative (e.g., code-free) information regarding application properties, etc.
4) TargetMappings are, as described above, mappings, associations, assignments, etc.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for development, delivery, deployment and operation of an application including executing instructions stored on a non-transitory computer-readable storage medium, the method comprising:

receiving a request to launch an application within a platform associated with a namespace for the platform, wherein the platform is one platform of a plurality of platforms;

responsive to receiving the request to launch the application, accessing a descriptor having an identifier that uniquely associates the descriptor with the application, wherein the descriptor comprises a single file that is platform independent and that includes a plurality of namespaces and application-specific attributes for each of the namespaces to enable the application to operate on multiple different platforms using a same descriptor, the single file of the descriptor comprising a single code portion and at least one configuration portion;

selecting from the plurality of namespaces in the descriptor the namespace for the platform in which the application was launched;

retrieving data by the application from the application-specific attributes from the selected namespace in the descriptor;

accessing the single code portion of the descriptor by the application, wherein the single code portion comprises a read-only document and the single code portion contains application-specific code created prior to deployment of the application;

accessing the at least one configuration portion of the descriptor by the application, wherein the at least one configuration portion references the single code portion and the at least one configuration portion comprises a write-enabled document containing customer-specific data; and configuring and operating the application using the retrieved data, the single code portion and the at least one configuration portion.

2. The method of claim 1 wherein:
the application includes a plurality of versions; and
each of the versions of the application is associated with a different descriptor and the identifier of the descriptor uniquely associates the descriptor with one of the plurality of versions of the application.

3. The method of claim 1 wherein the descriptor further comprises an application programming interface (API), the method further comprising:
updating one or more of the application-specific attributes of the descriptor using the API.

4. The method of claim 3 further comprising:
calculating transitive dependencies of the application and calculating a cachebuster token using the API to enable asynchronous loading of related resources to the application.

5. The method of claim 1 wherein the descriptor comprises the single code portion and multiple configuration portions, wherein each of the configuration portions reference the single code portion.

6. The method of claim 5 wherein each of the multiple configuration portions is represented by a tile, wherein the tile provides an access point for a user to launch the application.

7. The method of claim 1 wherein the application-specific attributes comprise both mandatory attributes and optional attributes.

8. A computer program product for development, delivery, deployment and operation of an application, the computer program product being tangibly embodied on a non-transitory computer-readable storage medium and comprising instructions that, when executed by at least one computing device, are configured to cause the at least one computing device to:
receive a request from an application at a descriptor for data from application-specific attributes in a requested namespace, the application having a unique identifier;
match the unique identifier from the application to an identifier of the descriptor, wherein the descriptor comprises a single file that is platform independent and that includes a plurality of namespaces and application-specific attributes for each of the namespaces to enable the application to operate on multiple different platforms using a same descriptor, the single file of the descriptor comprising a single code portion and at least one configuration portion, wherein:
the single code portion comprises a read-only document and the single code portion contains application-specific code created prior to deployment of the descriptor, and
the at least one configuration portion references the single code portion and the at least one configuration portion comprises a write-enabled document containing customer-specific data; and
in response to matching the unique identifier from the application to the unique identifier of the descriptor, provide and configure the application with the requested data from the application-specific attributes from the requested namespace in the descriptor, the single code portion and the at least one configuration portion.

9. The computer program product of claim 8 wherein the unique identifier of the descriptor uniquely associates the descriptor with one of a plurality of versions of the application.

10. The computer program product of claim 8 wherein the descriptor further comprises an application programming interface (API) and the instructions that, when executed by at least one computing device, are further configured to cause the at least one computing device to:
update one or more of the application-specific attributes of the descriptor using the API.

11. The computer program product of claim 10 wherein the descriptor comprises a reference to data stored in a repository that is external to the application and the descriptor and the instructions that, when executed by at least one computing device, are configured to cause the at least one computing device to:
calculate transitive dependencies of the application and calculating a cachebuseter token using the API to enable asynchronous loading of related resources to the application.

12. The computer program product of claim 8 wherein the descriptor comprises the single code portion and multiple configuration portions, wherein each of the configuration portions reference the single code portion.

13. The computer program product of claim 8 wherein the application-specific attributes comprise both mandatory attributes and optional attributes.

14. A system for development, deliver, deployment and operation of an application, the system comprising:
at least one memory including instructions on a computing device; and
at least one processor on the computing device, wherein the processor is operably coupled to the at least one memory and is arranged and configured to execute the instructions that, when executed, cause the processor to implement:
an application within a platform associated with a namespace for the platform, wherein the platform is one platform of a plurality of platforms; and
a descriptor having an identifier that uniquely associates the descriptor with the application, wherein the descriptor comprises a single file that is platform independent and that includes a plurality of namespaces and application-specific attributes for each of the namespaces to enable the application to operate on multiple different platforms using a same descriptor, the single file of the descriptor comprising a single code portion and at least one configuration portion, wherein:
the single code portion comprises a read-only document and the single code portion contains application-specific code created prior to deployment of the descriptor,
the at least one configuration portion references the single code portion and the at least one configuration portion comprises a write-enabled document containing customer-specific data, and
the application is configured and operated with application-specific attributes for the namespace of the application, the single code portion and the at least one configuration portion.

15. The system of claim 14 wherein:
the application includes a plurality of versions; and
each of the versions of the application is associated with a different descriptor and the identifier of the descriptor uniquely associates the descriptor with one of the plurality of versions of the application.

16. The system of claim 14 wherein the processor is operably coupled to the at least one memory and is arranged and configured to execute the instructions that, when executed, cause the processor to implement:
an application programming interface to enable updates to one or more application-specific attributes of the descriptor using the API.

17. The system of claim 14 wherein the descriptor comprises the single code portion and multiple configuration portions, wherein each of the configuration portions reference the single code portion.

* * * * *